United States Patent [19]

Salin

[11] Patent Number: 5,787,357
[45] Date of Patent: Jul. 28, 1998

[54] SHORT MESSAGE PROCESSING IN A MOBILE EXCHANGE

[75] Inventor: Hannu-Pekka Salin, Vantaa, Finland

[73] Assignee: Nokia Telecommunications Oy, Espoo, Finland

[21] Appl. No.: 668,828

[22] Filed: Jun. 24, 1996

Related U.S. Application Data

[63] Continuation of Ser. No. 211,662, Apr. 11, 1994, abandoned.

[30] Foreign Application Priority Data

Oct. 17, 1991 [GB] United Kingdom .............. 9122039

[51] Int. Cl.$^6$ ..................................... H04Q 7/20
[52] U.S. Cl. .................. 455/466; 455/422; 455/433
[58] Field of Search ......................... 455/422, 433, 455/435, 466, 560, 567; 370/349, 389

[56] References Cited

U.S. PATENT DOCUMENTS

| | | | |
|---|---|---|---|
| 4,623,886 | 11/1986 | Livingston | 370/94.1 |
| 5,454,024 | 9/1995 | Lebowitz | 455/466 |
| 5,507,006 | 4/1996 | Knight | 455/466 |
| 5,579,372 | 11/1996 | Astrom | 455/466 |

FOREIGN PATENT DOCUMENTS 2244409  11/1991  United Kingdom .

OTHER PUBLICATIONS

Holley, "The GSM Short Message Service", IEE Colloquium on 'GSM and PCN Enhanced Mobile Services', 1991, p. 7/1–7/5.

Recommendation GSM 03.40, "Technical Realization of the Short Message Service—oint–to–Point", version 3.5.0, European Telecommunications Standard Institute, ETSI/PT 12, Feb. 1992, see pp. 10–25, 53–54, 59–64.

"European digital cellular telecommunications system (phase 1); Point–to–point short message service support on mobile radio interface", 2nd Final Draft, Feb. 1992.

Textbook: "Data and Computer Communications", by William Stallings, Ph. D., pp. 130, 131, 136, 137, 138, 139, 1985.

*Primary Examiner*—Dwayne D. Bost
*Assistant Examiner*—Nay Maung
*Attorney, Agent, or Firm*—IP Group of Pillsbury Madison & Sutro LLP

[57] ABSTRACT

A method for processing a short message received at a mobile exchange in a cellular radio network, and a mobile exchange in a cellular radio system, including a short message deliver for delivering one short message at a time to a B subscriber; an operation controller for observing the operation of the B subscriber so as to detect the delivery of the short message and to prevent the delivery of another short message when the delivery of the preceding short message is in progress; a memory for storing rejected short messages; and a queue control responsive to the B-subscriber operation controller for reading the rejected short message from the memory so as to initiate the delivery of the short message to the B subscriber when the delivery of the preceding short message is completed.

4 Claims, 2 Drawing Sheets

SHORT MESSAGE PROCESSING IN A MOBILE EXCHANGE

This is a continuation of a application Ser. No. 08/211,662, filed on Apr. 11, 1994 ABN.

BACKGROUND OF THE INVENTION

The invention relates to a method for processing a short message received at a mobile exchange in a cellular radio network when the short message is received while a preceding short message is being delivered from the mobile exchange to a B subscriber; and to a mobile exchange in a cellular radio system, comprising a short message delivery means for delivering one short message at a time to a B subscriber; a means for observing the operation of the B subscriber so as to detect the delivery of the short message and to prevent the delivery of another short message when the delivery of the preceding short message is in progress.

It is known in cellular radio networks to send short messages via a short message service center (SC) separate from the cellular radio network. One system for sending and forwarding short messages is described in GSM 03.40, Feb. 1992, Technical Realization of Short Message Services Point to Point, ETSI/PT. The specification describes the interfacing of a short message service center (SC) to the mobile exchange of a cellular radio network and the operation of the short message service center when the center sends and forwards short messages from outside the cellular radio network and from one subscriber (A subscriber) to another (B subscriber) in the cellular radio network, or to an external message means capable of receiving and/or sending short messages. The transfer of short messages over a radio path between GSM terminal equipments, a mobile exchange and a short message service center is described more closely in GSM 04.11, Feb. 1992, MS-BSS Interface - Support of Short Message Service (p—p), ETSI/PT 12.

When the short message service center attempts to send a short message to the B subscriber, and the B subscriber is not reachable, a message waiting data list is included in the home location register (HLR) in compliance with GSM 03.40. The list stores for each B subscriber the addresses of the short message centers SC storing short messages to be forwarded to the B subscribers. Accordingly, when the B subscriber is connected to the network, i.e. a short message can be sent to the mobile radio of the B subscriber, the visitor location register (VLR) within the area of which the B subscriber is registered sends an indication of the reappearance of the B subscriber in the network to the HLR of the B subscriber. The HLR of the B subscriber thereby starts to send alert messages to the short message service centers included in the subscribers's message waiting data list so as to indicate the short message service centers that the B subscriber has become active within the area of the cellular radio network, and that sending of a short message to the mobile radio of the B subscriber can be attempted. This kind of situation may occur e.g. when the subscriber switches off the mobile radio for the night and then switches it on in the morning, or when the subscriber uses the mobile radio at work and starts it at the beginning of the working hours. Alert messages initiate the sending of the short messages of the B subscriber from the short message service centers over the cellular radio system to the B subscriber. The short message service center (SC) stores the short messages on the basis of the MSISDN (Mobile Station International PSTN/ISDN Number) of the B subscriber. However, the short message service center (SC) does not know if different MSISDN numbers belong to one and the same B subscriber but it may simultaneously start the sending of several short messages to the same B subscriber. Similarly, if a plurality of short message service centers attached to the cellular radio network attempt to deliver short messages to the same B subscriber substantially simultaneously, the mobile exchange associated with the VLR is not able to deliver short messages received after a preceding short message but it has to send a negative acknowledgement to the short message service center. Collision of short messages at the mobile exchange thus results in the delivery of negative acknowledgement messages to the short message service center over the cellular radio network. The short message service center (SC) thereby waits for a predetermined period of time and then again attempts to send the short message. Imagine a situation where the delivery of more than one short messages has been attempted to a B subscriber but the B subscriber has not been currently connected to the cellular radio network. The short messages addressed to the mobile radio of the B subscriber have thus been stored in the memories of different short message service centers to be subsequently delivered to the B subscriber. When the B subscriber then becomes active within the area of the cellular radio network, the HLR of the B subscriber sends alert messages to all short message service centers storing short messages addressed to the B subscriber. All short message service centers there-after attempt to send, nearly simultaneously, the short messages to the B subscriber. As a result, a short message collision situation occurs at the mobile exchange of the location area of the B subscriber, as the mobile exchange is able to send only one short message at a time. For instance, if ten different short message service centers have attempted to send a short message so that the delivery of the first message (i.e. a preceding message) from the mobile exchange of the location area to the B subscriber has been in progress, the delivery attempts of the next nine short messages will not be successful. The short message service centers which had delivered the short messages thus receive negative acknowledgements indicating unsuccessful short-message delivery from the mobile exchange of the location area. The nine short message service centers which made the nine unsuccessful short message delivery attempts now send the short messages anew to the mobile exchange of the location area of the B subscriber for delivery to the B subscriber. The first short message (i.e. the preceding message) will again reach the B subscriber while the eight subsequent messages will not reach the B subscriber but their unsuccessful delivery results in the sending of negative acknowledgements to the respective short message service centers. The above-described situation is further aggravated when more than one mobile radios or terminal equipments to which short message deliveries have been attempted when they were not connected to the network are connected substantially simultaneously to the network. In such a case, when the mobile radios are connected to the cellular radio network, several short message service centers attempt to deliver short messages to the B subscribers, and only a few of the attempts will be successful. Acknowledgements indicating unsuccessful deliveries and redeliveries of the short messages cause a considerable increase in the signalling traffic within the cellular radio network, thus affecting adversely the mobile communication and hampering the operation of the cellular radio network.

SUMMARY OF THE INVENTION

The object of the present invention is to avoid the problems caused by substantially simultaneous reception of short messages addressed to the same B subscriber at the mobile exchange and to speed up the delivery of short messages and reduce unnecessary signalling and short message traffic within the cellular radio network.

This new method for processing a short message received at a mobile exchange in a cellular radio network is characterized in that the short message received during the delivery of the preceding short message is stored in a memory and delivered from the mobile exchange to the B subscriber after the completion of the delivery of the preceding short message from the mobile exchange to the B subscriber.

The new mobile exchange according to the invention in a cellular radio network is characterized in that it comprises: a memory means for storing rejected short messages; and a queue control means responsive to the B subscriber operation control means for reading the rejected short message from the memory means so as to initiate the delivery of the short message to the B subscriber when the delivery of the preceding short message is completed.

The invention is based on the idea that the memory of the mobile exchange of the location area of the B subscriber stores short messages the delivery of which to the B subscriber has been unsuccessful as the delivery of a preceding short message to the B subscriber has been in progress when the next short message was received at the mobile exchange.

An advantage of this method for processing a short message received at the mobile exchange of a cellular radio network and the mobile exchange of the cellular radio network is that problems caused by the substantially simultaneous reception of short messages at the mobile exchange are avoided. In order words, the collision of short messages at the mobile exchange of the location area of the B subscriber and, consequently, negative acknowledgements indicating unsuccessful delivery as well as unnecessary signalling and short message traffic are avoided. Accordingly, the use of the method and the mobile exchange according to the invention speeds up the delivery of short messages and reduces the risk of interference caused by the overloading of the cellular radio system.

BRIEF DESCRIPTION OF THE DRAWING

In the following the invention will be described in greater detail with reference to the attached drawings, in which.

DETAILED DESCRIPTION

The method according to the invention will be described below in connection with the digital GSM mobile radio system, which is the primary application area of the invention. However, the method according to the invention may also be applied in other radio systems or in the modifications of the GSM system. The basic configuration and basic functions of the GSM mobile radio system are well-known to one skilled in the art and relatively accurately defined in the specifications of the GSM system, particularly: GSM Recommendations 01.02; 11.30; 11.31; 11.32; 03.40.

Figure 1:
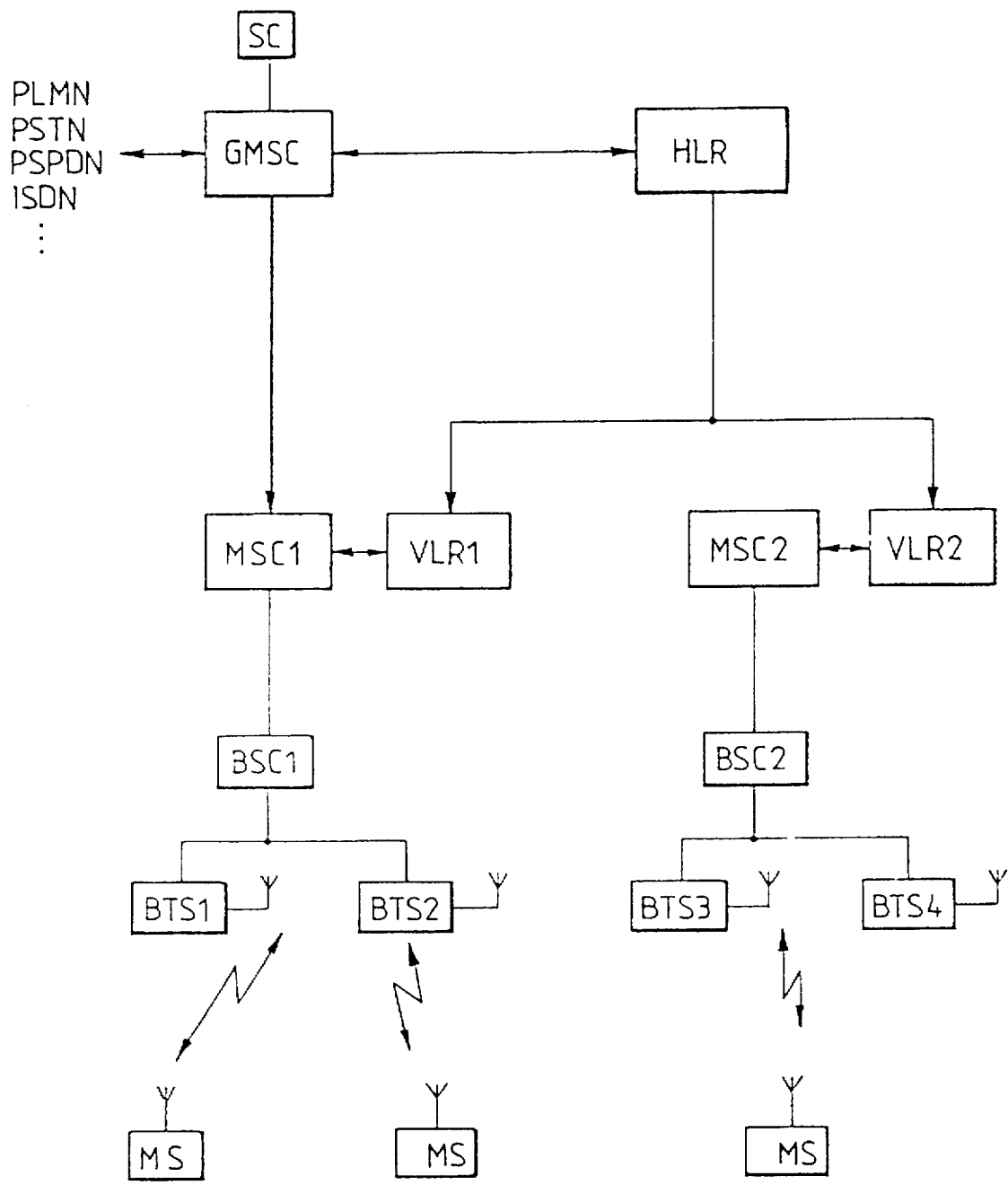
FIG. 1 is a diagram illustrating a cellular radio system in which the method and the mobile exchange according to the invention are applicable.

A GSM network, shown in FIG. 1, usually comprises a single home location register HLR, which is a database storing permanently the data of the mobile radio, such as location data. The system also contains several visitor location registers VLR, one or more for each service area. The visitor location register VLR is a database storing the data of the mobile radio while the mobile radio visits the area of the VLR, i.e. within the location area of the mobile radio. The VLR knows the location of the mobile radio MS with the accuracy of one location area (LAI). The HLR in turn knows which VLR area the mobile radio MS visits and provides mobile radio terminating calls with routing data to the telephone network, i.e. the VLR address of the location area of the B subscriber. The HLR in turn receives the required routing data from the VLR. The HLR and VLR have merely a signalling connection to other components in the mobile radio network. In the system shown in FIG. 1, each service area has a dedicated visitor location register VLR connected to the mobile exchange MSC of the respective service area. FIG. 1 shows two service areas, one of which comprises a mobile exchange MSC1 and a visitor location register VLR1, while the other comprises a mobile exchange MSC2 and a visitor location register VLR2. Each service area contains one or more location areas (LAI), and traffic is controlled within each location area by a base station controller BSC, which controls several fixed radio stations, i.e. base transceiver stations BTS. Each one of the above-mentioned radio cells comprises a single base station BTS, and each base station controller BTC provides services for several cells. A mobile radio MS residing in the cell establishes a two-way radio connection with the base station BTS of the cell. Both a signalling connection and speech channels are established between the base station controller BSC and the mobile exchange MSC. The mobile exchange MSC1 controls the base station controller BSC1, which in turn controls base stations BTS1 and BTS2. Correspondingly, the MSC2 within the other service area controls the location area comprising a base station controller BSC2 and base stations BTS3 and BTS4.

The GSM network is usually connected to other networks, such as a public switched telephone network PSTN, another mobile radio network PLMN, a packet-switched data network PSPDN, an ISDN or a short message service center SC, via a specific mobile exchange called a gateway-MSC GMSC. One or more (or all) of the mobile exchanges of the network may operate as a GMSC. A speech channel connection can be switched from the GMSC to any other mobile exchange MSC of the network. The GMSC also has a signalling connection with the HLR. The HLR in turn has a signalling connection with the VLRs. Alternatively, the exchange of another data transmission system, such as an ISDN exchange, may also operate as a GMSC. FIG. 1 further shows a short message service center SC which delivers a short message over the cellular radio network to the mobile radio MS.

Figure 2:
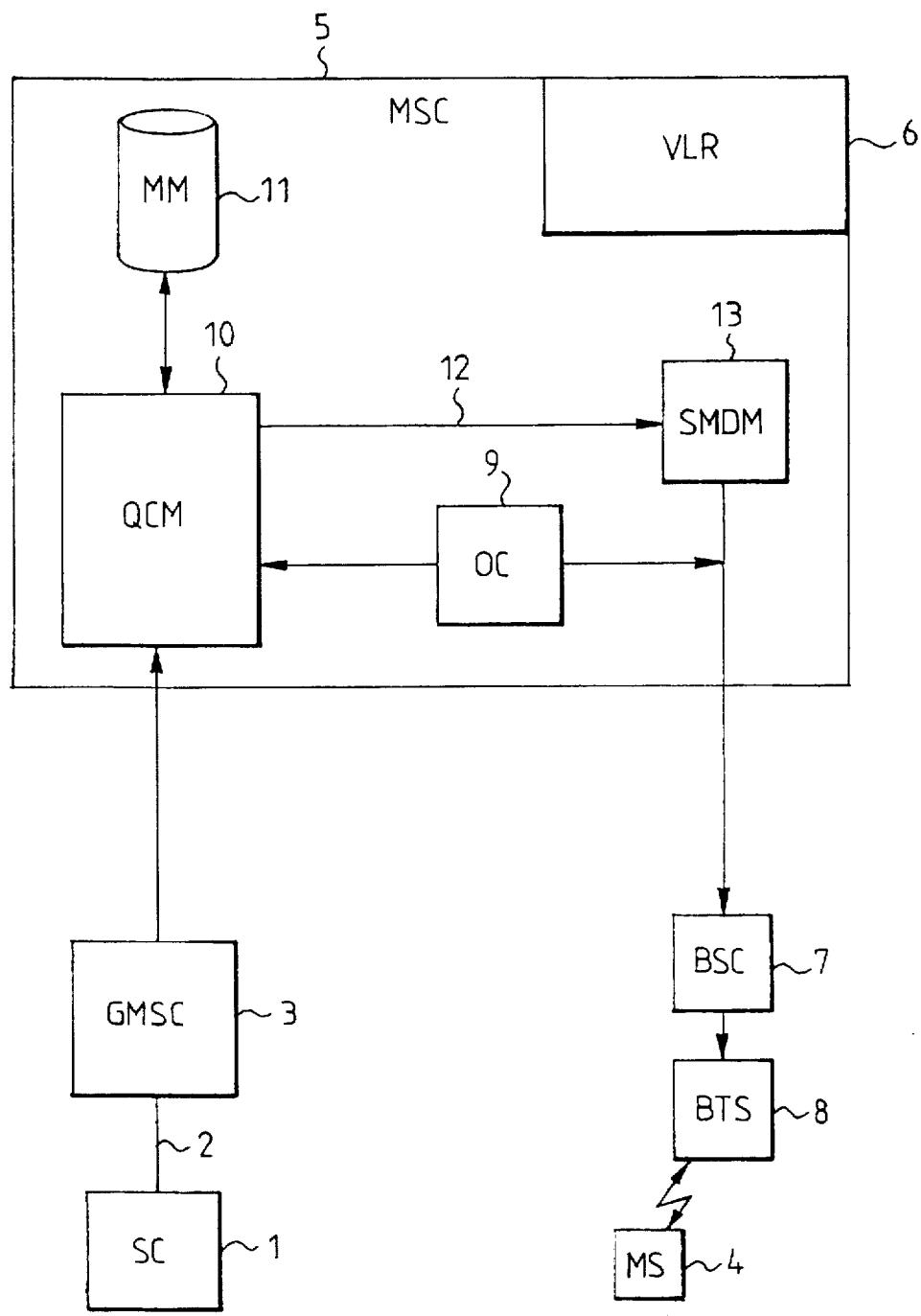
FIG. 2 is a block diagram illustrating a mobile exchange according to the invention.

In FIG. 2 the short message service center SC 1 delivers 2 a short message via a GMSC 3 to a mobile exchange MSC 5 of a B subscriber MS 4, a visitor location register VLR 6 of the B subscriber's location area being connected to the MSC 5. The invention is operative in a situation in which a preceding short message is being delivered from the mobile exchange MSC 5 via a base station controller BSC 7 and a base station BTS 8 to the B subscriber MS 4. Upon receiving the short message, the mobile exchange 5 requests the VLR 6 to send routing data for the short message by sending a SendInfoForIncomingCall message. The VLR answers by sending a Page(IMSI, TMSI, LAI) message so as to request the mobile exchange MSC to page the B subscriber within its service area. However, before the paging of the B subscriber, a means OC 9 for controlling the operation of the B subscriber in the mobile exchange 5 detects that there is a radio connection between the B subscriber and the base station 8 of the mobile exchange 5 and that a short message previously received at the mobile exchange is being delivered to the B subscriber 4. The mobile exchange thereby sends a negative acknowledgement PageNack(Busy Subscriber) to the VLR 6 so as to indicate that the B subscriber is busy due to a short message delivery. The VLR answers by sending a negative SendInfoForIncomingCallNack(Impossible Call Completion) acknowledgement. A queue control means QCM 10 provided in the mobile exchange 5 thereby stores the later received, rejected short message in a short message storing means MM 11 where it waits for a repeated delivery. The short message stored in the memory 11 is assigned an identity code, on the basis of which it can be subsequently found in the memory 11. This takes place when the B subscriber operation control means OC 9 detects the completion of the delivery of the preceding short message, and informs the queue control means QCM 10 about it. The QCM 10 reads the rejected short message from the memory means MM 11 and forwards 12 it to a short message delivery means SMDM 13 for further delivery to the mobile radio 4 of the B subscriber via the base station controller 7 and the base station 8. The delivery of the short message to the B subscriber is initiated by calling the short message delivery means SMDM 13 by using its process identity code.

The drawings and the description related to them are only intended to illustrate the idea of the invention. In their details the method for processing a short message received at a mobile exchange in a cellular radio network and the mobile exchange of the cellular radio network according to the invention may vary within the scope of the claims. Even though the invention has been described above mainly with reference to the GSM system it is applicable in other type of radio systems as well.

I claim:

1. A method for processing a short message in a cellular radio system in which there is at least one mobile radio exchange having a memory and a base station, at least one radio base station, and at least one radio subscriber, said method comprising the steps of:

(a) providing at least one short message center for delivering short messages to said mobile radio exchange to be received by said mobile radio exchange;

(b) delivering a first short message for said radio subscriber by said short message center to said mobile radio exchange;

(c) delivering a second short message for said radio subscriber by said short message center to said mobile radio exchange;

(d) initialing delivery of the first short message from said mobile radio exchange to said radio subscriber;

(e) while conducting step (d), monitoring whether there is a radio connection between said base station and said radio subscriber, and whether said first short message is being delivered to said radio subscriber during said radio connection;

(f) in response to said monitoring, detecting that said first short message is being delivered to said radio subscriber, but that such delivery is not yet completed at a time when delivery of the second short message from said mobile radio exchange to said radio subscriber is available at said mobile radio exchange for initiation of deliver thereof to said radio subscriber;

(g) in response to said detecting of step (f), storing said second short message in said memory of said mobile radio exchange;

(h) in response to said monitoring of step (e), detecting that delivery of said first short message to said radio subscriber has been completed;

(i) in response to said detecting of step (h), initiating delivery of the second short message from said memory, to said radio subscriber.

2. The method of claim 1, further comprising:

in connection with conducting step (g), assigning an identity code to said second short message; and in connection with conducting step (i), searching for and finding said second short message in said memory by searching for said identity code and correlating said identity code with said second short message, and retrieving said second short message from said memory based on said correlating.

3. A cellular radio system, comprising:

at least one mobile radio exchange, at least one radio base station, at least one short message center, at least one radio subscriber, the mobile exchange further comprising a short message delivery means for delivering one short message at a time to a radio subscriber via the radio base station over a radio path;

a means for observing operation of the mobile radio exchange so as to detect the completion of the delivery of a preceding first short message via the radio base station on the radio path and to prevent delivery of a second short message via said radio base station on said radio path, when the delivery of said preceding first short message is in progress, by monitoring the delivery of said preceding first short message from said mobile radio exchange to said radio subscriber by monitoring whether there is a radio connection between said radio subscriber and said radio base station and whether said preceding first short message previously received at the mobile radio exchange is being delivered to the radio subscriber during said radio connection, and thereby rejecting said second short message;

a memory means associated with said mobile radio exchange for storing the rejected second short message; and a queue control means responsive to said means for observing operation of said mobile radio exchange for reading said rejected second short message from said memory means so as to initiate delivery of said second short message to said radio subscriber after detecting that delivery of said preceding first short message via said radio base station over said radio path to the radio subscriber has become completed.

4. The cellular radio system according to claim 3, further including:

means for initiating delivery of said second short message via said radio base station over said radio path to said radio subscriber by calling said short message delivery means by a process identity code of said second short message.

* * * * *

UNITED STATES PATENT AND TRADEMARK OFFICE
CERTIFICATE OF CORRECTION

PATENT NO.   : 5,787,357
DATED        : July 28, 1998
INVENTOR(S)  : Salin

It is certified that error appears in the above-identified patent and that said Letters Patent is hereby corrected as shown below:

Title page,
Item [30], Foreign Application Priority Data, "October 17, 1991 [GB] United Kingdom 9122039" to -- August 11, 1992 [FI] Finland 923597 --
Item [63], Related U.S. Application Data, after "abandoned" please add -- , which is the National Stage Application of Internation Application PCT/FI93/00305 filed July 28, 1993 --

Signed and Sealed this

Thirteenth Day of July, 2004

JON W. DUDAS
*Acting Director of the United States Patent and Trademark Office*